United States Patent
Kim et al.

(10) Patent No.: US 9,438,963 B2
(45) Date of Patent: Sep. 6, 2016

(54) WIRELESS AUDIO TRANSMISSION METHOD AND DEVICE

(75) Inventors: Zhun-woo Kim, Seoul (KR); Seong-cheol Jang, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1993 days.

(21) Appl. No.: 11/581,425

(22) Filed: Oct. 17, 2006

(65) Prior Publication Data

US 2007/0136770 A1  Jun. 14, 2007

(30) Foreign Application Priority Data

Dec. 12, 2005 (KR) .................. 10-2005-0121896

(51) Int. Cl.
- *H04B 5/00* (2006.01)
- *H03G 3/00* (2006.01)
- *H04N 21/81* (2011.01)
- *H04N 21/2368* (2011.01)
- *H04N 21/41* (2011.01)
- *H04N 21/434* (2011.01)
- *H04N 21/4363* (2011.01)

(Continued)

(52) U.S. Cl.
CPC ...... *H04N 21/8106* (2013.01); *H04N 21/2368* (2013.01); *H04N 21/4131* (2013.01); *H04N 21/4341* (2013.01); *H04N 21/43637* (2013.01); *H04N 21/6162* (2013.01); *H04R 5/04* (2013.01); *H04R 3/12* (2013.01); *H04R 2420/07* (2013.01)

(58) Field of Classification Search
CPC .... H04R 21/021; H04R 21/02; H04R 1/222; H04R 1/38; H04R 9/02; H04R 9/08; H04R 2420/07; H04R 2420/09; H04R 3/12; H04R 5/00; H04R 5/04; H04R 27/00; H03B 5/00; H03B 5/0006; H03B 5/0025; H03B 5/0031

USPC ............... 381/61, 103, 86, 77, 74, 309, 310; 700/94; 455/3.06

See application file for complete search history.

(56) References Cited

U.S. PATENT DOCUMENTS 4,829,500 A * 5/1989 Saunders .......................... 369/5
5,182,552 A * 1/1993 Paynting ...................... 340/4.42

(Continued)

FOREIGN PATENT DOCUMENTS

| CN | 1327686 | 12/2001 |
|---|---|---|
| CN | 1525482 | 9/2004 |

(Continued)

OTHER PUBLICATIONS

NL Search Report issued Feb. 17, 2009 in Netherlands Patent Application No. 1032850.

(Continued)

*Primary Examiner* — Xu Mei
(74) *Attorney, Agent, or Firm* — Staas & Halsey LLP

(57) ABSTRACT

A wireless audio transmission method and a device. The wireless audio transmission device includes: an audio processor that receives a digital audio signal from an external multimedia apparatus when the wireless audio transmission device is docked at the external multimedia apparatus, performing a predetermined signal processing operation of adding a sound effect to the received digital audio signal, and generating a composite signal; a wireless transmission processor to receive the composite signal generated by the audio processor and to convert the received composite signal into a wireless packet; and a wireless transmitter to modulate the wireless packet into an RF signal and to transmit the RF signal.

30 Claims, 5 Drawing Sheets

(51) Int. Cl.
  *H04N 21/61* (2011.01)
  *H04R 5/04* (2006.01)
  *H04R 3/12* (2006.01)

(56) References Cited

U.S. PATENT DOCUMENTS

| | | | | |
|---|---|---|---|---|
| 5,668,884 | A * | 9/1997 | Clair et al. | 381/82 |
| 6,007,228 | A | 12/1999 | Agarwal et al. | |
| 6,487,296 | B1 * | 11/2002 | Allen et al. | 381/80 |
| 6,728,585 | B2 | 4/2004 | Neoh | |
| 6,778,869 | B2 * | 8/2004 | Champion | 700/94 |
| 7,483,538 | B2 * | 1/2009 | McCarty et al. | 381/77 |
| 2004/0223622 | A1 * | 11/2004 | Lindemann et al. | 381/79 |
| 2006/0056638 | A1 * | 3/2006 | Schobben | 381/17 |

FOREIGN PATENT DOCUMENTS

| | | |
|---|---|---|
| CN | 1606241 | 4/2005 |
| KR | 20-272789 | 4/2002 |
| KR | 2003-71061 | 9/2003 |
| KR | 2004-38356 | 5/2004 |
| KR | 2005-48104 | 5/2005 |
| KR | 2005-88662 | 9/2005 |
| WO | 2004052049 | 6/2004 |
| WO | 2004064036 | 7/2004 |

OTHER PUBLICATIONS

CN Office Action issued Jan. 9, 2009 in Chinese Patent Application No. 200610166913.6.
Korean Office Action dated Nov. 17, 2006 issued in KR 2005-121896.
CN Rejection Decision issued May 19, 2011 in CN Patent Application No. 200610166913.6.
Chinese Notice of Reexamination dated Oct. 29, 2012 issued in CN Application No. 200610166913.3.
Chinese Decision of Reexamination dated Apr. 30, 2014 issued in CN Application No. 200610166913.6.

* cited by examiner

WIRELESS AUDIO TRANSMISSION METHOD AND DEVICE

CROSS-REFERENCE TO RELATED APPLICATIONS

This application claims the benefit of Korean Patent Application No. 10-2005-0121896, filed on Dec. 12, 2005, in the Korean Intellectual Property Office, the disclosure of which is incorporated herein in its entirety by reference.

BACKGROUND OF THE INVENTION

1. Field of the Invention

The present general inventive concept relates to a digital media device, and more particularly, to wireless audio transmission method and device.

2. Description of the Related Art

A recent personal audio system is diversified as a PMP, a DMB system and so on, as well as an MP3 player. Although people may have little interest in the audio system on its own, there are convergence products in which the MP3 player and a mobile phone are combined. Analogue audio systems such as portable cassette players were used in the past, but recently personal audio systems based on digital sources have been widely used.

However, while the personal audio systems have been developed, home digital multimedia apparatuses, such as HD televisions, are not easily connectible with the personal audio systems. When a function dedicated to the personal audio system is desired to be embodied in the home digital multimedia apparatuses, the home digital multimedia apparatuses have to be reconstructed or another product has to be purchased. It is impossible to apply a user's favorite equalizer and various sound field effects dedicated to the conventional personal audio system to the home digital multimedia apparatuses. In addition, the conventional personal audio system has no function for the home digital multimedia apparatuses that do not support a wireless headphone.

Therefore, the user's favorite equalizer and the various sound field effects in the conventional personal audio system can not be applied to the home digital multimedia apparatuses. As a result, the conventional personal audio system lacks usefulness. In addition, when only a specified user wants to listen to an audio signal from a specified channel by the use of the home digital multimedia apparatus, the conventional personal audio system has another disadvantage that an audio wire has to be connected to the home digital multimedia apparatus, the personal audio system, and an ear phone or a headphone.

SUMMARY OF THE INVENTION

The present general inventive concept provides a wireless audio transmission method in which a new audio system can be constructed by connecting a personal audio system to a home digital multimedia apparatus and adding a sound effect and wireless audio transmission can be performed by the use of the new audio system.

The present invention also provides a wireless audio transmission device employing the above-mentioned wireless audio transmission method.

Additional aspects and advantages of the present general inventive concept will be set forth in part in the description which follows and, in part, will be obvious from the description, or may be learned by-practice of the general inventive concept.

The foregoing and/or other aspects and utilities of the present general inventive concept are achieved by providing a wireless audio transmission method including receiving a digital audio signal from an external multimedia apparatus connected in a docking manner, performing a predetermined signal processing operation of adding a sound effect to the received digital audio signal and generating a composite signal, receiving the composite signal and converting the received composite signal into a wireless packet, and modulating the wireless packet into an RF signal and transmitting the RF signal.

A connector may have a structure combining the connection element into the external multimedia apparatus in a docking manner.

An audio signal received by the connector may be a digital audio signal.

The foregoing and/or other aspects and utilities of the present general inventive concept are also achieved by providing a wireless audio transmission device including an audio processor to receive a digital audio signal from an external multimedia apparatus when the wireless audio transmission device is docked into the external multimedia apparatus, to perform a predetermined signal processing operation of adding a sound effect to the received digital audio signal, and to generate a composite signal, a wireless transmission processor to receive the composite signal generated by the audio processor and to convert the received composite signal into a wireless packet, and a wireless transmitter to modulate the wireless packet into an RF signal and to transmit the RF signal.

The predetermined signal processing operation of a composite signal generator may be a signal processing operation for headphone virtualization.

The predetermined signal processing operation of a composite signal generator may be a signal processing operation to generate a 3D sound.

The foregoing and/or other aspects and utilities of the present general inventive concept are also achieved by providing a wireless audio transmission device including an audio processor to receive a digital audio signal from an external multimedia apparatus when connected thereto, to add a predetermined sound effect to the received digital audio signal based on a predetermined type of sound to be realized, and to generate a composite signal; and a wireless transmission processor to convert the composite signal into a wireless packet to be wirelessly transmitted.

The audio processor may include a channel selector to select one of a plurality of channels and to receive the audio signal through the selected channel when the external multimedia apparatus outputs a plurality of audio signals through the plurality of channels.

The audio processor may further include a connector to receive the digital audio signal and channel information of the external multimedia apparatus together with audio control information.

The foregoing and/or other aspects and utilities of the present general inventive concept are also achieved by providing a wireless audio transmission method including receiving a digital audio signal from an external multimedia apparatus docked thereto, adding a sound effect to the received digital audio signal and generating a composite signal, and converting the composite signal into a wireless packet to be transmitted wirelessly.

The foregoing and/or other aspects and utilities of the present general inventive concept are also achieved by providing a readable/recordable medium containing a method of wireless audio transmission, the method including receiving a digital audio signal at a personal audio system from an external multimedia apparatus connected in a docking manner, performing a predetermined signal processing operation of adding a sound effect to the received digital audio signal and generating a composite signal, converting the composite signal into a wireless packet, and modulating the wireless packet into an RF signal and transmitting the RF signal.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
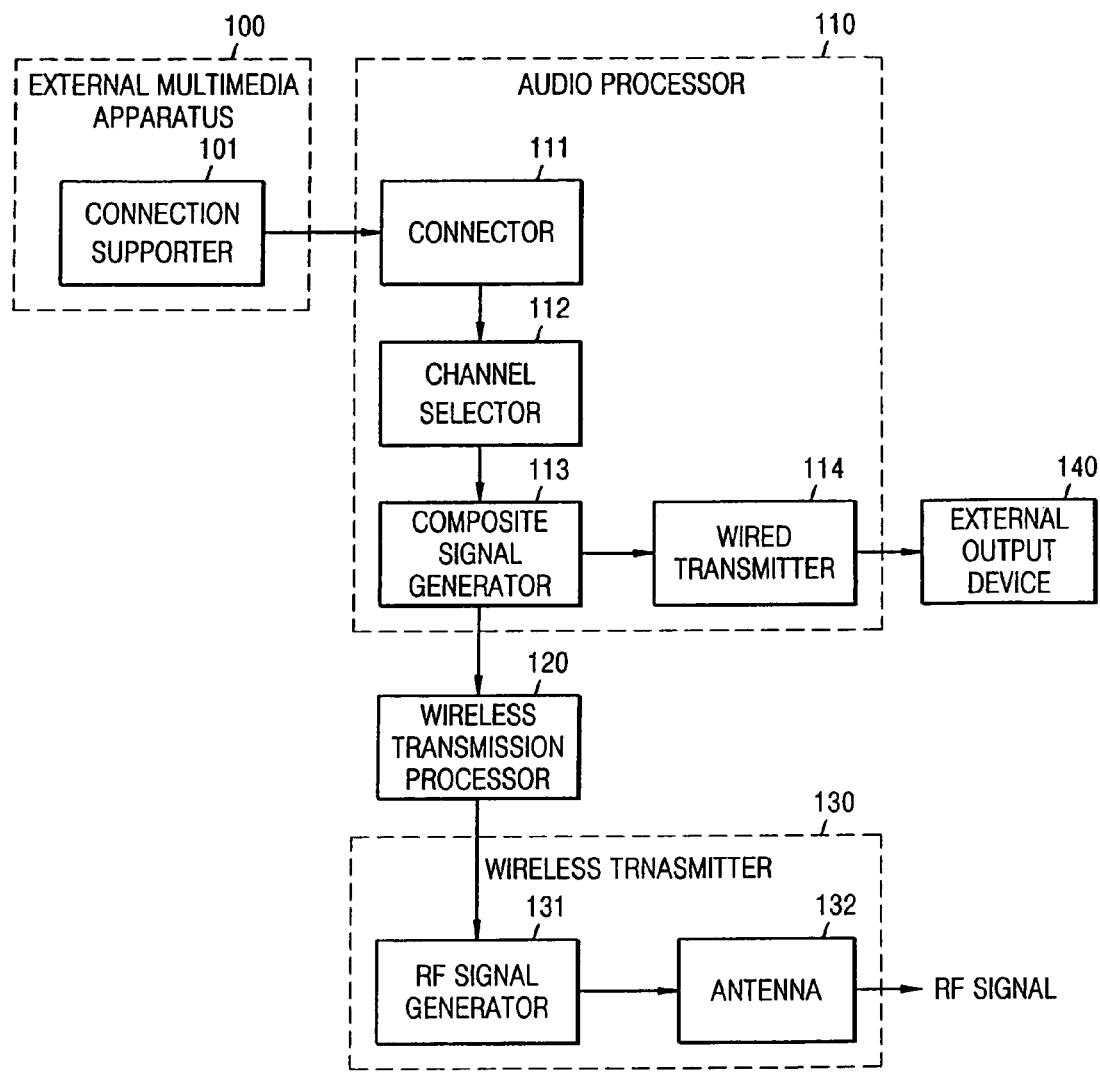
FIG. 1 is a block diagram illustrating a wireless audio transmission device according to an embodiment of the present general inventive concept connected to an external multimedia apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a wireless audio transmission device according to an embodiment of the present general inventive concept, connected to an external multimedia apparatus 100. The wireless audio transmission device according to the embodiment of FIG. 1 can include an audio processor 110, a wireless transmission processor 120 and a wireless transmitter 130. The external multimedia apparatus 100 can include an element (not illustrated) to generate an audio signal. A connection supporter 101 has a structure to connect the external multimedia apparatus to a connector 111 of the wireless audio transmission device in a predetermined manner. When the connection supporter 101 is connected to the connector 111, an audio signal is transmitted from the connection supporter 101 to the connector 111. The audio processor 110 becomes connected to the external multimedia apparatus 100 at this point and receives the audio signal from the external multimedia apparatus 100. Then, the audio processor 110 performs a predetermined signal processing operation of adding a sound effect to the received audio signal and generates a composite signal.

The audio processor 110 can include the connector 111 and a composite signal generator 113.

The connector 111 can include an element to connect the audio processor 110 to the external multimedia apparatus 100. When the connection element is connected to the external multimedia apparatus 100, the connector 111 receives the audio signal from the external multimedia apparatus. The connector 111 may further receive channel information of the external multimedia apparatus 100 and various audio control information.

The connector 111 can have a structure to combine the connection element (of the connector 111) into the external multimedia apparatus 100 in a docking manner. For example, when a predetermined sized portable MP3 player is connected into a predetermined sized hole equipped in a home television, the portable MP3 player is fixed in the home television and the audio signal of the home television can be controlled by the portable MP3 player. The signal received by the connector 111 from the external multimedia apparatus 100 may be a digital audio signal.

The connector 111 may include a Sony/Phillips Digital Interface Format (SPDIF) terminal and can receive the digital audio signal from the external multimedia apparatus 100 through the SPDIF terminal.

The composite signal generator 113 can perform a predetermined signal processing operation for the audio signal received by the connector 111 and can generate a composite signal. The predetermined signal processing operation is a signal processing operation of adding a sound effect to the received audio signal.

The predetermined signal processing operation that is performed by the composite signal generator 113 may be a signal processing operation for headphone virtualization. The headphone virtualization is to convert a multi-channel audio signal, which is a two or more channel audio signal, into an audio signal optimized in the headphone with two channels.

The predetermined signal processing operation performed by the composite signal generator 113 may be a signal processing operation to generate a 3D sound. The generating of the 3D sound means generating a virtual stereo sound which allows a listener recognize the two channel audio signal as the multi-channel audio signal.

The predetermined signal processing operation performed by the composite signal generator 113 may be an equalization process predefined by a user.

The audio processor 110 may further include a channel selector 112 which selects one of a plurality of channels and receives the audio signal output through the selected channel when the external multimedia apparatus 100 outputs a plurality of audio signals through a plurality of channels. A plurality of audio signals output through a plurality of channels may be a plurality of digital audio signals corresponding to a plurality of broadcasting services.

For example, a predetermined size of a portable MP3 player is connected with a home television that supports a picture-in-picture (PIP). A user can select one of two broadcasting channels on one television screen, control the audio signal received through the selected channel by the portable MP3 player and listen to the audio signal by a wireless communication. That is, the audio signal of the non-selected channel is output through a speaker of the home television, and the audio signal of the selected channel, to which the sound effect is added, is output by the wireless communication.

The audio processor 110 may further include a wired transmitter 114 that has a structure connectable to an external output device 140 and can transmit a composite signal generated by the audio processor 110 when the audio processor 110 is connected to the external output device 140 through a wire. The external output device 140 may include a wired headphone or a speaker system equipped outside of the wireless audio transmission device.

A wireless transmission processor 120 receives the composite signal generated by the audio processor 110 and converts the received composite signal into a wireless packet. The wireless transmission processor 120 may receive the composite signal generated by the audio processor 110 and convert the received composite signal into a Bluetooth packet by the use of a Bluetooth protocol.

The wireless transmission processor 120 may receive the composite signal generated by the audio processor 110 and convert the received composite signal into a WiFi packet by the use of a WiFi protocol. The WiFi protocol may include one or more of 802.11a, 802.11b, and 802.11g.

A wireless transmitter 130 can modulate a wireless packet of the wireless transmission processor 120 into an RF signal and can transmit the RF signal. The wireless transmitter 130 may include an RF signal generator 131 and an antenna 132.

The RF signal generator 131 can convert the wireless packet generated by the wireless transmission processor 120 into an analogue signal and can modulate the converted analogue signal into the RF signal.

The antenna 132 outputs the RF signal wirelessly. The output wireless RF signal is received by a wireless head set or wireless ear phone and is transmitted to ears of a listener.

Figure 2:
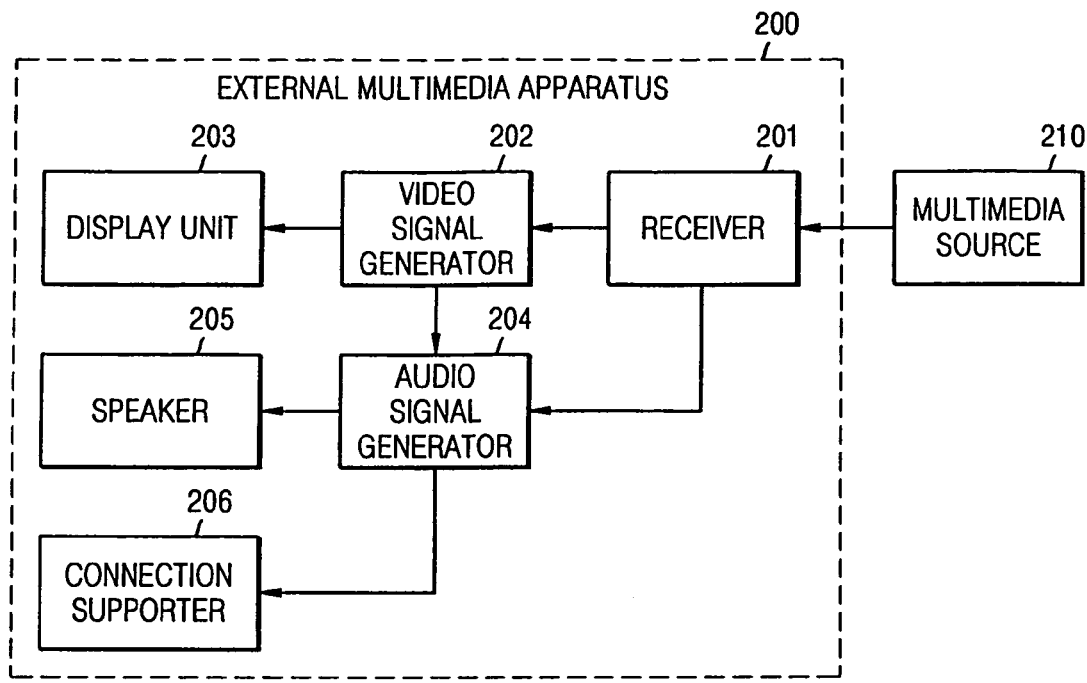
FIG. 2 is a block diagram illustrating an external multimedia apparatus connected to the wireless audio transmission device of FIG. 1.

FIG. 2 is a detailed block diagram illustrating an external multimedia apparatus connected to the wireless audio transmission device of in FIG. 1. An external multimedia apparatus 200 may include a receiver 201, a video signal generator 202, a display unit 203, an audio signal generator 204, a speaker 205, and a connection supporter 206. A multimedia source 210 may be an external DVD player, a video tape player, a public broadcasting service, a satellite broadcasting service, or a wired broadcasting service. The receiver 201 receives a multimedia signal from the multimedia source 210. The video signal generator 202 extracts a picture-related signal from the multimedia signal received by the receiver 201, converts the picture-related signal into a proper format signal for the display unit 203, and generates a video signal. The audio generator 204 extracts a voice-related signal from the multimedia signal received by the receiver 201, converts the voice-related signal into a proper format signal for the speaker 205, and generates an audio signal. In addition, the audio generator 204 transmits the generated audio signal to the connection supporter 206. The connection supporter 206 can be connected to the connector 111 of the wireless audio transmission device of the embodiment of FIG. 1 in a predetermined manner.

Figure 3:
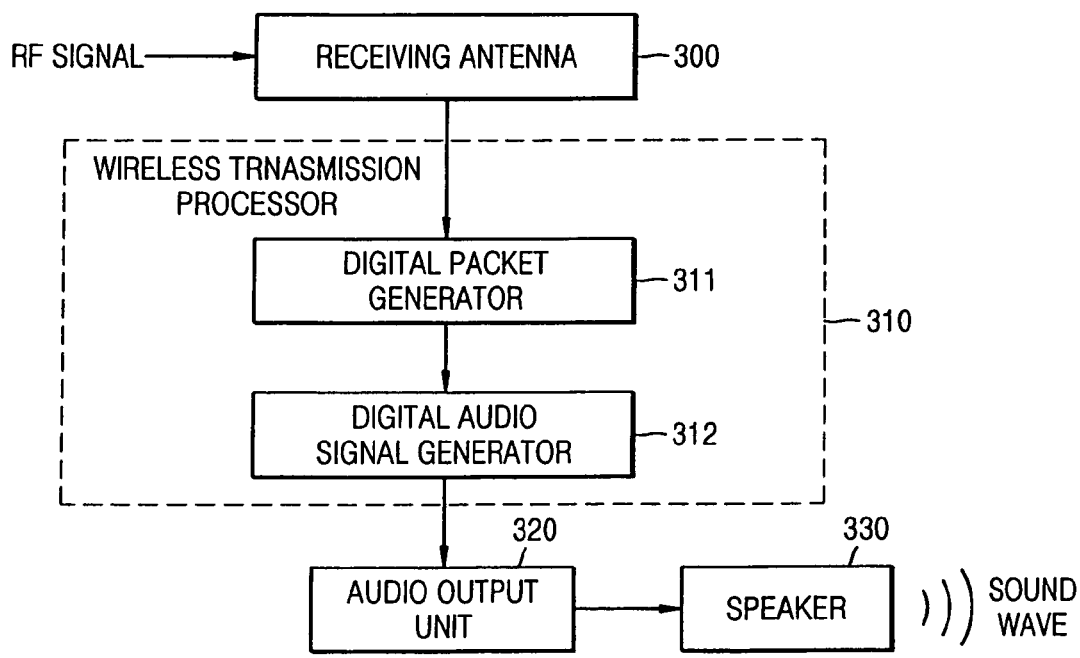
FIG. 3 is a block diagram illustrating a wireless audio receiver to receive a wireless RF signal from the wireless audio transmission device of FIG. 1.

FIG. 3 is a block diagram illustrating a wireless audio receiver that receives a wireless RF signal from the wireless audio transmission device of FIG. 1.

A receiving antenna 300 of the wireless audio receiver receives the wireless RF signal output by the antenna 132 of FIG. 1.

A wireless transmission processor 310 of the wireless audio receiver converts the wireless RF signal received by the receiving antenna 300 into a digital audio signal.

The wireless transmission processor 310 may include a digital packet generator 311 and a digital audio signal generator 312. The digital packet generator 311 modulates the received RF signal into digital packet data through a data recovery process. The digital audio signal generator 312 converts the digital packet data generated by the digital packet generator 311 into a digital audio data.

An audio output unit 320 converts the digital audio data into an analogue signal, amplifies the converted analogue signal, and outputs the amplified signal. The audio output unit 320 may include a digital-analogue converter (D/A converter) and an amplifier.

A speaker 330 outputs the analogue signal from the audio output unit 320 into a sound wave and transmits the sound wave to ears of a listener.

Figure 4:
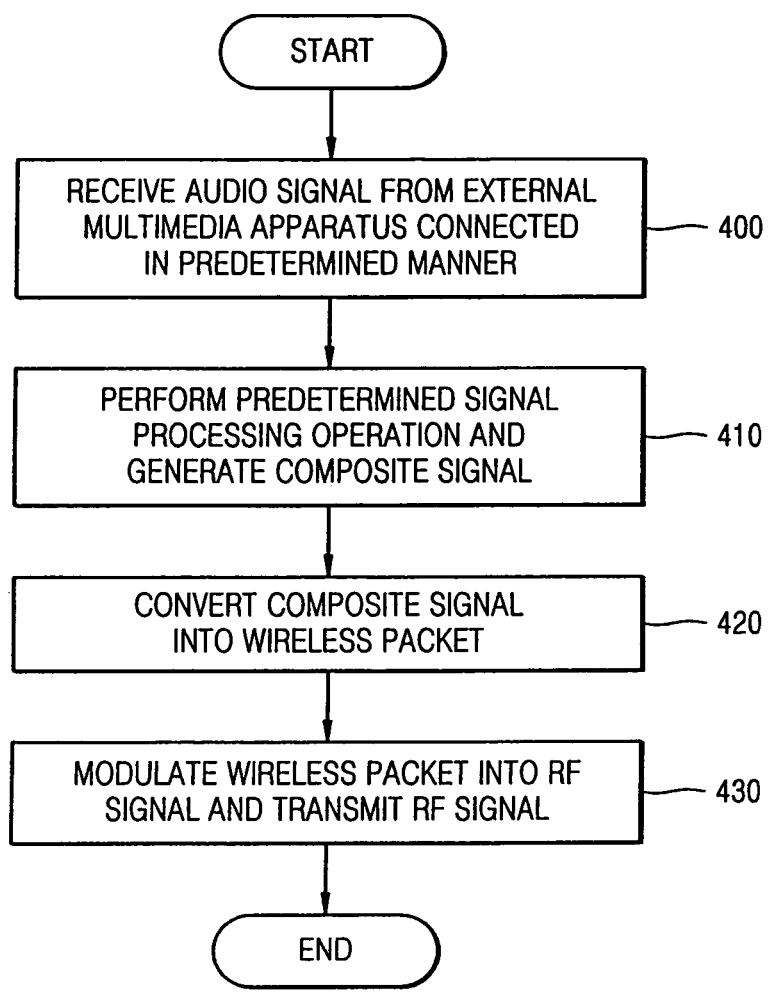
FIG. 4 is a flow chart illustrating a wireless audio transmission method according to an embodiment of the present general inventive concept.

FIG. 4 is a flow chart illustrating a wireless audio transmission method according to an embodiment of the present general inventive concept.

In the embodiment of FIG. 4, an audio signal is received from the external multimedia apparatus 100 (see FIG. 1) connected in a predetermined manner (process 400). The wireless audio transmission device can be docked into the external multimedia apparatus 100 as described supra. For example, when a predetermined size of a portable MP3 player is connected with a predetermined sized hole equipped in a home television, the portable MP3 player is fixed in the home television and the audio signal of the home television can be controlled by the portable MP3 player.

The audio signal received from the external multimedia apparatus 100 may be a digital audio signal. When the wireless audio transmission device (i.e., the portable MP3 player) is docked in the external multimedia apparatus 100, the digital audio signal from the external multimedia apparatus 100 can be received through an SPDIF terminal during the process of receiving the audio signal (process 400).

When the audio signal is received at the audio transmission device, the predetermined signal processing operation of adding the sound effect to the received audio signal is performed, and a composite signal is generated (process 410). The predetermined signal processing operation may be a signal processing operation for headphone virtualization. The predetermined signal processing operation may be a signal processing operation for generating a 3D sound. The predetermined signal processing operation may be an equalization process predefined by a user. Then, the composite signal is received by a wireless transmission processor 120, and the received composite signal is converted into the wireless packet (process 420). The wireless packet may be a Bluetooth packet or a WiFi packet, but is not be limited to these types of packets.

As described above, the composite signal may be received by a transmission processor 120, and the composite signal may be converted into the WiFi packet by the use of WiFi protocol, in the process of converting the composite signal into a wireless packet (process 420). The WiFi protocol may include one or more of 802.11a, 802.11b, and 802.11g.

The wireless packet is then modulated into an RF signal and then the RF signal is transmitted (process 430).

Figure 5:
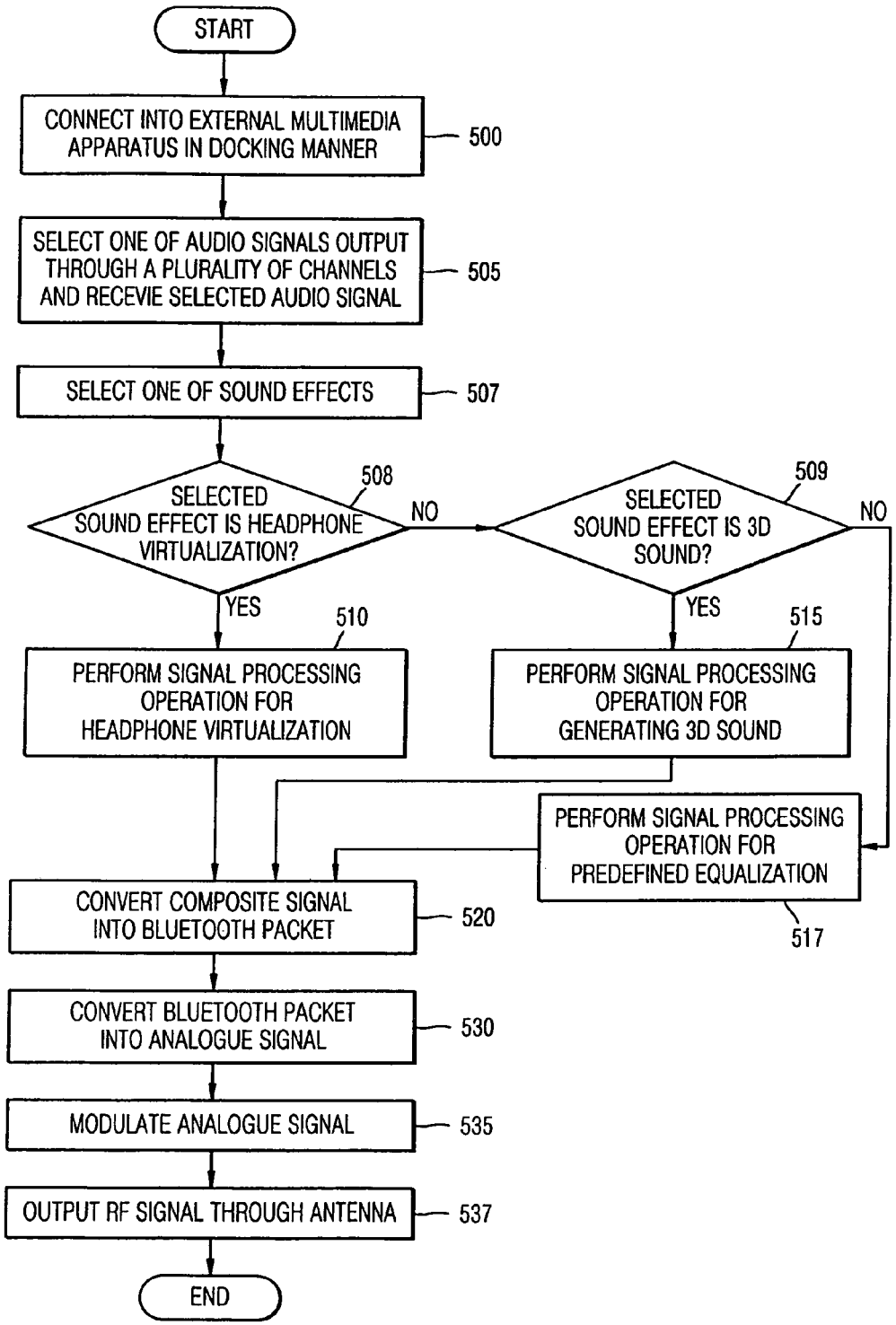
FIG. 5 is a detailed flow chart of FIG. 4.

FIG. 5 is a detailed flow chart of FIG. 4. First, the wireless audio transmission device (such as the one illustrated in FIG. 1) can be docked in an external multimedia apparatus 100 (process 500).

Then, one of the audio signals output from the external multimedia apparatus 100 through a plurality of channels is selected and the audio signal of the selected channel is received at the wireless audio transmission device (process 505). A plurality of audio signals output through a plurality of channels may be a plurality of digital audio signals corresponding to a plurality of broadcasting services.

A sound effect can be selected in the process of receiving the audio signal (process 507). The process of selecting the sound effect can be performed before the audio signal is received.

Then, it is determined whether the selected sound effect is the headphone virtualization type (process 508). When the selected sound effect is determined to be the headphone virtualization type, the headphone virtualization technique is performed, and the audio signal is converted into the composite signal (process 510). When the selected sound effect is not the headphone virtualization type, it is determined whether the selected sound effect is the 3D sound type (process 509). Then, when the selected sound effect is determined to be the 3D sound type, the signal processing operation of generating the 3D sound is performed, and the audio signal is converted into the composite signal (process 515).

When the selected sound effect is not the headphone virtualization type and is not the 3D sound type, the signal processing operation for a predefined equalization is performed, and the audio signal is converted into the composite signal (process 517).

Then, the composite signal is converted into a Bluetooth packet by use of a Bluetooth protocol (process 520).

The Bluetooth packet is converted into the analogue signal (process 530).

The analogue signal is modulated into an RF signal to transmit the analogue signal wirelessly.

Finally, the RF signal is output through an antenna such as the antenna 132 (process 537). An external wireless receiver (such as illustrated in FIG. 3) receives the RF signal through a receiving antenna (i.e., receiving antenna 300), converts the received RF signal into the sound signal, and transmits the sound signal to ears of a listener.

Figure 6:
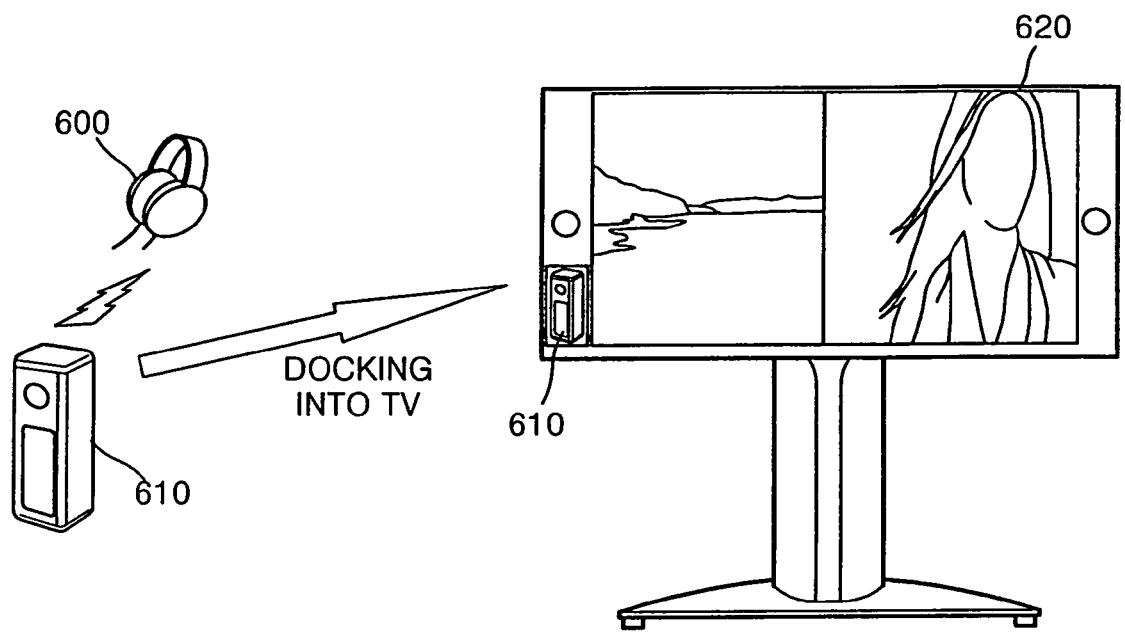
FIG. 6 illustrates another embodiment of the present general inventive concept.

FIG. 6 illustrates an embodiment of the present general inventive concept.

When personal audio system 610 is docked into a home digital television 620 with docking elements dedicated to the personal audio system 610, the home digital television 620 and the personal audio system 610 construct an audio system according to an embodiment of the present general inventive concept. The newly constructed audio system selects an audio signal of one of two broadcasting channels on the home digital television 620 and adds a selected sound effect to the selected audio signal. In addition, the newly constructed audio system outputs the above processed audio signal wirelessly to output a voice through a wireless head set 600.

As described above, according to various embodiments of the present general inventive concept, it is possible to construct a new audio system by connecting a personal audio system with a home digital multimedia apparatus and to perform adding a sound effect and wireless audio transmission by use of the new audio system. In addition, it is possible to conveniently construct a new audio system without using an audio wire, improve usefulness of the personal audio system and strengthen a function of the home digital multimedia apparatus.

Also as described above, according to various embodiments of the present general inventive concept, it is possible to construct a wireless audio transmission device including an audio processor to receive a digital audio signal from an external multimedia apparatus when connected thereto, to add a predetermined sound effect to the received digital audio signal based on a predetermined type of sound to be realized, and to generate a composite signal, and a wireless transmission processor to convert the composite signal into a wireless packet to be wirelessly transmitted.

Further, as described above, according to various embodiments of the present general inventive concept, it is possible to provide a wireless audio transmission method including receiving a digital audio signal from an external multimedia apparatus docked thereto, adding a sound effect to the received digital audio signal and generating a composite signal, and converting the composite signal into a wireless packet to be transmitted wirelessly.

The various embodiments of the present general inventive concept can be embodied through software. When the software is executed, the elements of the present general inventive concept are code segments performing required processes. Programs or code segments can be stored in a processor-readable medium, or can be transmitted as a computer data signal combined with a carrier wave in a transmission medium or a communication network.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A wireless audio transmission device comprising:
   a processor to receive a digital audio signal from an external multimedia apparatus when the wireless audio transmission device is connected to the external multimedia apparatus, to perform a predetermined signal processing operation of adding a sound effect to the received digital audio signal, and to generate a composite signal,
   wherein the processor comprises a channel selector to select one of a plurality of channels when the external multimedia apparatus outputs digital audio signals of a plurality of broadcasting services through the plurality of channels and to receive the digital audio signal output through the selected channel, and
   wherein the plurality of channels correspond to different broadcasting services.

2. The device of claim 1, wherein the processor comprises:
   a connector including a connection element to be docked into the external multimedia apparatus and to receive the digital audio signal from the external multimedia apparatus when the connection element is docked; and
   a composite signal generator to perform the predetermined signal processing operation on the digital audio signal received by the connector and to generate the composite signal.

3. The device of claim 2, wherein the connector comprises an SPDIF terminal and receives the digital audio signal through the SPDIF terminal.

4. The device of claim 1, wherein the processor comprises a wired transmitter to have a structure connectable to an external output device and to transmit the composite signal generated by the processor when the processor is connected to the external output device through a wire.

5. The device of claim 1, wherein the predetermined signal processing operation is a signal processing operation for headphone virtualization.

6. The device of claim 1, wherein the predetermined signal processing operation is a signal processing operation for a 3D sound.

7. The device of claim 1, wherein the wireless audio transmission device further comprises:
   a wireless transmission processor to receive the composite signal generated by the processor and to convert the received composite signal into a wireless packet,
   wherein the wireless transmission processor receives the composite signal generated by the processor and converts the received composite signal into a Bluetooth packet by use of a Bluetooth protocol.

8. The device of claim 7, wherein the wireless transmission processor receives the composite signal generated by the processor and converts the received composite signal into a WiFi packet by use of a WiFi protocol.

9. The device of claim 7, wherein the wireless transmission processor comprises:
an RF signal generator to convert the wireless packet generated by the wireless transmission processor into an analogue signal and to modulate the converted analogue signal into an RF signal; and
an antenna to output the RF signal wirelessly.

10. A wireless audio transmission method comprising:
receiving a digital audio signal from an external multimedia apparatus connected in a docking manner; and
performing a predetermined signal processing operation of adding a sound effect to the received digital audio signal and generating a composite signal;
wherein the receiving of the digital audio signal comprises selecting one of a plurality of channels when the external multimedia apparatus outputs digital audio signals of a plurality of broadcasting services through the plurality of channels and receiving the digital audio signal output through the selected channel, and
wherein the plurality of channels correspond to different broadcasting services from each other.

11. The method of claim 10, wherein the receiving of a digital audio signal comprises receiving the digital audio signal by use of an SPDIF terminal.

12. The method of claim 10, wherein the receiving of a digital audio signal comprises selecting one of a plurality of channels when the external multimedia apparatus outputs digital audio signals of a plurality of broadcasting services through the plurality of channels and receiving only the digital audio signal output through the selected channel.

13. The method of claim 10, wherein the performing of the predetermined signal processing operation is a signal processing operation for headphone virtualization.

14. The method of claim 10, wherein the performing of the predetermined signal processing operation is a signal processing operation of generating a 3D sound.

15. The method of claim 10, the method further comprising:
converting the composite signal into a wireless packet,
wherein the converting of the composite signal into a wireless packet comprises receiving the composite signal and converting the received composite signal into a Bluetooth packet by use of a Bluetooth protocol.

16. The method of claim 15, wherein the converting of the composite signal into a wireless packet comprises receiving the composite signal and converting the received composite signal into a WiFi packet by use of a WiFi protocol.

17. The method of claim 10, the method further comprising:
modulating the wireless packet into an RF signal and transmitting the RF signal;
wherein the modulating of the wireless packet into an RF signal and transmitting the RF signal comprises:
converting the wireless packet into an analogue signal;
modulating the converted analogue signal into an RF signal; and
outputting the RF signal through an antenna wirelessly.

18. A wireless audio transmission device comprising:
a processor to receive a digital audio signal from an external multimedia apparatus when connected thereto, to add a predetermined sound effect to the received digital audio signal based on a predetermined type of sound to be realized by performing signal processing of the received digital audio signal, and to generate a composite signal; and
wherein the processor comprises a channel selector to select one of a plurality of channels and to receive the audio signal through the selected channel when the external multimedia apparatus outputs a plurality of audio signals of a plurality of broadcasting services through the plurality of channels, and
wherein the plurality of channels correspond to different broadcasting services from each other.

19. The device of claim 18, wherein the processor is connectable to the external multimedia apparatus by a docking operation.

20. The device of claim 18, wherein the predetermined sound effect added to the digital audio signal is one which realizes a headphone virtualization.

21. The device of claim 18, wherein the predetermined sound effect added to the digital audio signal is one which realizes a 3D sound.

22. The device of claim 18, wherein the predetermined sound effect added to the digital audio signal is one which realizes an effect predefined by a user.

23. The device of claim 18, wherein the processor further comprises:
a wireless transmission processor to convert the composite signal into a wireless packet to be wirelessly transmitted; and
a connector to receive the digital audio signal and channel information of the external multimedia apparatus together with audio control information.

24. A wireless audio transmission method comprising:
receiving a digital audio signal from an external multimedia apparatus docked thereto; and
adding a sound effect to the received digital audio signal by performing signal processing of the received digital audio signal and generating a composite signal; and
wherein the receiving of the digital audio signal comprises selecting one of a plurality of channels when the external multimedia apparatus outputs digital audio signals of a plurality of broadcasting services through the plurality of channels and receiving the digital audio signal output through the selected channel, and
wherein the plurality of channels correspond to different broadcasting services from each other.

25. The method of claim 24, wherein the composite signal is generated for a headphone virtualization.

26. The method of claim 24, wherein the composite signal is generated for a 3D sound.

27. The method of claim 24, wherein the converting of the composite signal comprises converting the composite signal into a Bluetooth packet by using a Bluetooth protocol.

28. The method of claim 24, further comprising wirelessly transmitting the wireless packet.

29. A non-transitory readable/recordable medium containing computer-readable instructions that, when executed by the computer, perform a method of wireless audio transmission, the method comprising:
receiving a digital audio signal at a personal audio system from an external multimedia apparatus connected in a docking manner;
performing a predetermined signal processing operation of adding a sound effect to the received digital audio signal and generating a composite signal;
wherein the receiving of the digital audio signal comprises selecting one of a plurality of channels when the external multimedia apparatus outputs digital audio signals of a plurality of broadcasting services through the plurality of channels and receiving the digital audio signal output through the selected channel, and wherein the plurality of channels correspond to different broadcasting services from each other.

30. A non-transitory readable/recordable medium containing computer-readable instructions that, when executed by the computer, perform a method of wireless audio transmission, the method comprising:

receiving a digital audio signal from an external multimedia apparatus docked thereto;

adding a sound effect to the received digital audio signal by performing signal processing of the received digital audio signal and generating a composite signal; and wherein the receiving of the digital audio signal comprises selecting one of a plurality of channels when the external multimedia apparatus outputs digital audio signals of a plurality of broadcasting services through the plurality of channels and receiving the digital audio signal output through the selected channel, and wherein the plurality of channels correspond to different broadcasting services from each other.

\* \* \* \* \*